TRIM LEVER LIGHT COMPENSATOR FOR REFLECTED LINE IMAGE

Filed April 14, 1966

INVENTOR
ARTHUR J. SPARLING

BY

Christie, Parker & Hale
ATTORNEYS.

TRIM LEVER LIGHT COMPENSATOR FOR REFLECTED LINE IMAGE

Filed April 14, 1966 Sheet 2 of 2

INVENTOR.
ARTHUR J. SPARLING
BY
Christie, Parker & Hale
ATTORNEYS.

United States Patent Office 3,453,040

Patented July 1, 1969

3,453,040

TRIM LEVER LIGHT COMPENSATOR FOR REFLECTED LINE IMAGE

Arthur J. Sparling, Manhattan Beach, Calif., assignor to Hogan Faximile Corporation, Los Angeles, Calif., a corporation of Delaware Filed Apr. 14, 1966, Ser. No. 542,634
Int. Cl. G02f *1/34*
U.S. Cl. 350—275 6 Claims

ABSTRACT OF THE DISCLOSURE

A reflected line image light compensator employing a plurality of individually rotatable and decoupled trim levers is disclosed. An axle and shaft are supported between spaced parallel support members. Each trim lever has a hole through which said axle extends and each pair of levers is separated by a thin spacer. Each spacer has a pair of holes through which said shaft and axle extend and is thus secured against rotation about said axle. A portion of each rotatable trim lever can be projected into the reflected light path forming the line image by a rotation of the lever. The spacer means act to decouple each trim lever from adjacent trim levers so that each lever is individually rotatable independently of all other trim levers.

BACKGROUND OF THE INVENTION

*Field of the invention*

This invention relates to optical scanning equipment such as used in facsimile scanners and, more particularly, is concerned with an adjustable light compensator for variations in light intensity along the line of scanning.

*Description of the prior art*

In transmitting units for facsimile communication systems a point by point optical scan of the document to be transmitted is required. Such a facsimile scanning device is described in Patent No. 3,011,020 assigned to the same assignee as the present invention. In such an arrangement, a narrow line of a document is illuminated, the document being moved slowly past the line of illumination. Light reflected from the illuminated surface portion of the document being transmitted is focused as a line image on an opaque screen by a suitable lens and mirror system. The line image is then scanned point by point by a rotating scanning disk, and the light transmitted by the scanning disk is sensed by a photo tube to convert variations in light intensity to an electrical signal.

With a blank document providing a uniform reflective surface, the output from the photo tube during the scanning operation should be at a constant signal level. However, because of uneven distribution of light intensity along the extent of the illuminated line on the surface of the document, because of uneven illumination and imperfections in the optical system, because of variations in the sensitivity of the photo tube in different areas exposed to the scanning light, and because of manufacturing tolerances, a variation in output signal level may occur even though the reflective qualities of the surface being scanned are uniform.

The present invention is directed to an improved light compensator which provides a simple optical correction to the scanning system so as to compensate for all sources of non-linearity in the system. The compensator can be easily adjusted to permit individual correction of each machine despite variations from machine to machine which affect the overall linearity of the system.

In brief, the present invention provides a light compensator in the form of a plurality of trim levers which are pivotally mounted on a common shaft. Rotation of the trim levers moves a projecting tip of the lever into and out of the path of reflected light from the surface of the document being scanned. Each trim lever is individually adjustable independently of all the other trim levers mounted on the common shaft. Spacers are provided between the trim levers which effectively decouple the trim levers so that adjustment of one trim lever does not affect any of the other trim levers. The levers can be individually adjusted by hand without interference of the operation of the optical system. The amount of light intercepted by each trim lever can be quite small so that the minimum resolution of the compensator is quite small.

For a more complete understanding of the invention, reference should be made to the accompanying drawings wherein.

Figure 1:
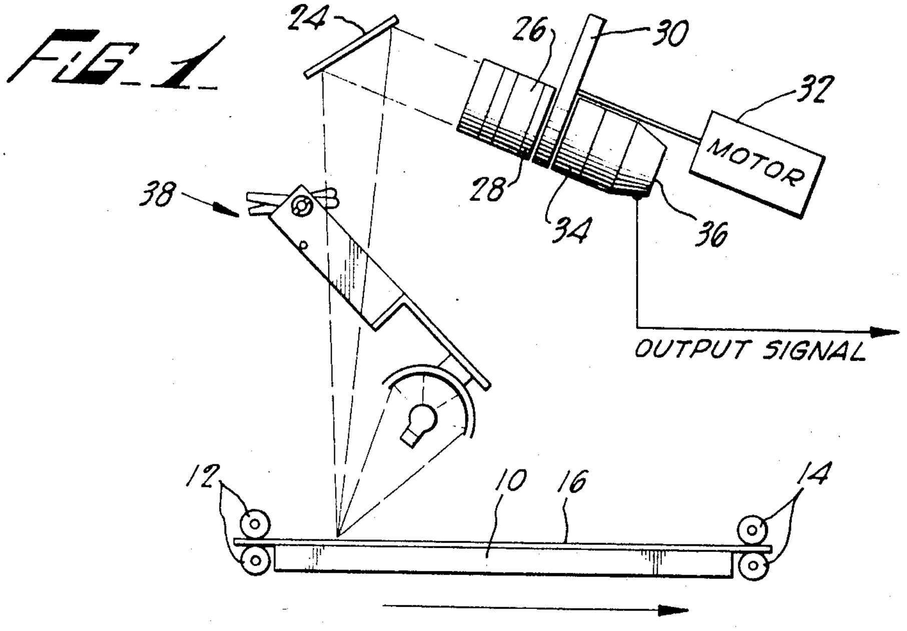
FIGURE 1 is a side elevational view showing in schematic form the optical system of a facsimile scanner incorporating the present invention.
Figure 2:
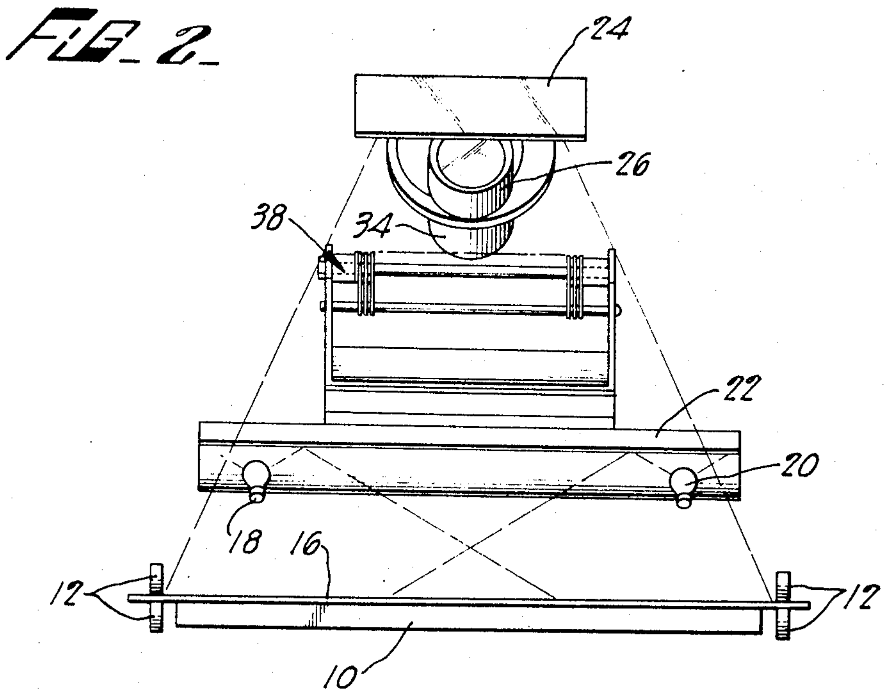
FIGURE 2 is a front elevational view of the facsimile scanner of FIGURE 1.

Referring to FIGURES 1 and 2 in detail, there is shown a facsimile scanner which includes a flat horizontal platen 10 with a pair of feed rollers, indicated at 12 and 14 and driven by suitable drive means (not shown), positioned to move a sheet of paper at a predetermined speed across the upper surface of the platen 10. The sheet of paper, such as indicated at 16, moves across the platen in the direction indicated by the arrow in FIGURE 1, and is illuminated along a narrow line extending the width of the paper in a direction transverse to the direction of motion of the paper.

The surface of the paper 16 is illuminated along a thin line from a pair of bulbs 18 and 20 positioned in front of a cylindrical mirror 22. The bulbs are positioned near the outer extremities of the mirror 22 so as to provide stronger illumination near the margins of the paper in relation to the level of illumination at the center of the paper. This light distribution provides compensation for a lower efficiency of the optical system to light reflected from the margins of the paper in relation to light reflected from the center of the paper. It should be noted that for clarity, the supporting frame structure of the elements of the optical system has not been shown in FIGURES 1 and 2. It is well within the skill of the art for a designer to provide a suitable frame structure by which the various elements are rigidly supported in their proper spacial relationships.

While a large portion of the light focused on the surface of the paper by the mirror 22 is reflected off at the principal angle of reflection, there is some scattering of light in all directions off the surface of the paper. Some of the scattered reflected light falls on a planar mirror 24 located directly above the surface of the paper 16 but at a position which does not fall within the normal angle of reflection of the light from the mirror 22. This is done because it has been found that the scattered reflected light provides higher contrast in response to printed matter on the surface of the paper 16.

The light reflected by the mirror 24 is directed into a lens system 26 which forms a focused image on a ground glass screen at 28. The image on the screen 28, which corresponds in detail to the illuminated portion of the surface of the paper 16, is scanned in time by a rotating scanning disk 30 which is rotated by a constant speed motor 32.

The scanning disk, as described in the above-identified patent, is provided with a spiral slit. The slit permits only a small segment of light from the line image on the screen 28 to pass into a second lens system 34 which focuses the light on a photo tube indicated at 36. As the spiral disk 30 rotates, the portion of the line image exposed to the photo tube advances from one end of the line image to the other end of the line image. Thus the photo cell produces an output signal which varies in magnitude with time corresponding to the variations in light intensity along the length of the line image formed on the screen 28.

Figure 3:
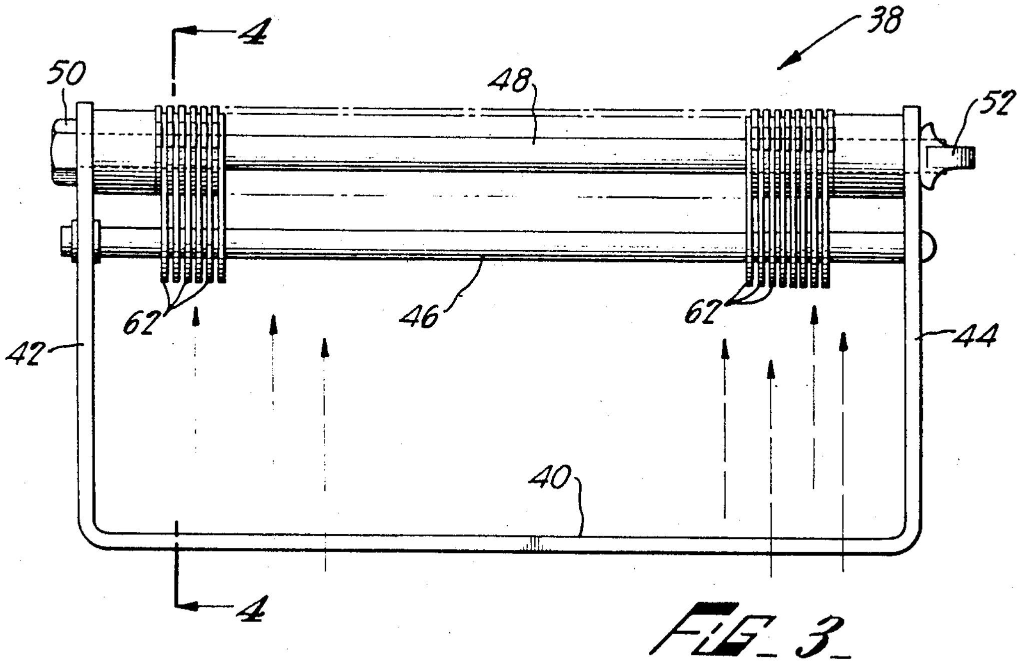
FIGURE 3 is an enlarged detailed view of the light compensator assembly.
Figure 4:
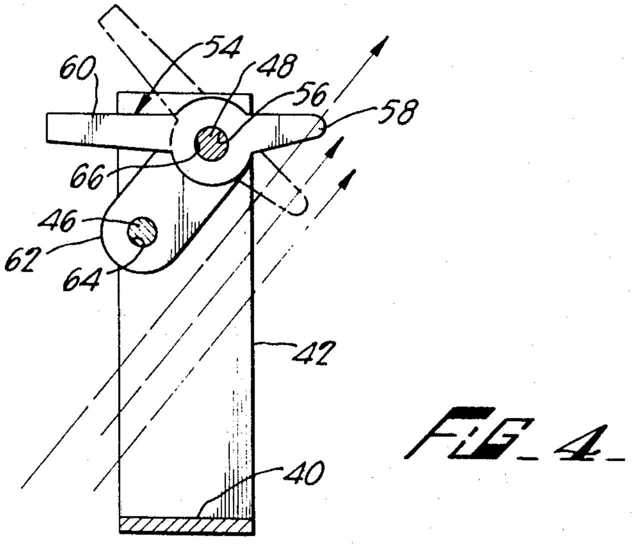
FIGURE 4 is a sectional view taken substantially on the line 4—4 of FIGURE 3.

In spite of careful design of the optical system and careful attention to manufacturing tolerances, it is impossible to achieve complete linearity of the output signal of the scanner. Thus with a sheet of paper 16 having uniform reflective characteristics over its whole surface, the output signal normally will not be constant during the scan of a complete line. The source of such nonlinearity is due to inherent optical limitations and to variations in equipment within normal manufacturing tolerances. It is therefore necessary to provide some means of adjusting the scanner after it is assembled to correct for the nonlinearity of the output signal. This is accomplished, according to the teaching of the present invention, by an adjustable light compensator assembly indicated generally at 38. The light compensator is shown in detail in FIGURES 3 and 4.

The light compensator includes a supporting frame 40 in the form of a U-shaped bracket having two spaced parallel side portions 42 and 44. A first shaft 46 extends between the two portions 42 and 44 and is rigidly secured in position so as to act as a spacer between the parallel portions of the support bracket 40. A second shaft 48 is in the form of a bolt which extends through aligned holes in the two side portions 42 and 44. The bolt includes a head 50 at one end and is threaded to receive a wing nut 52 at the other end. A plurality of trim levers, such as indicated at 54, are formed with a single hole 56 through which the bolt 48 passes. Each of the trim levers 54 is stamped out of thin sheet metal preferably of the order of 1/32" thick. Each lever is provided with a light intercepting tip 58 and an adjusting arm 60.

Each of the trim levers is spaced from adjacent trim levers by spacer members, such as indicated at 62. The spacer members are also made from stamped sheet metal of the order of .010" in thickness. Each spacer member is provided with two holes, 64 and 66, which are spaced apart so that the bolt 48 can pass through the hole 66 while the shaft 46 passes through the hole 64. Thus while the trim levers can be pivoted about the bolt shaft 48, the spacer members are held in fixed angular position in relation to the supporting bracket 40. In addition, spacer washers may be provided on the bolt 48 at either end within the space between the side portions 42 and 44. Thus by tightening up on the wing nut 52, the trim levers are clamped between the spacer members and frictionally locked in any selected angular position.

As shown in FIGURES 1 and 2, the light compensator assembly 38 is mounted such that the reflected light from the paper 16 which falls on the mirror 24 passes between the shaft 46 and the bottom of the bracket 40. The light rays are substantially parallel to the plane defined by the axes of the shaft 46 and bolt 48 when the compensator is mounted in proper position. Thus rotation of a trim lever 54 by means of the adjusting arm 60 moves the light intercepting tip 58 between a position in which a maximum amount of light is intercepted, such as shown by the dotted line position in FIGURE 4, and a position in which the light interceptor tip is moved out of the path of the light as shown by the solid line position in FIGURE 4. Full adjustment is achieved by substantially a 45° rotation of the trim lever.

With the light compensator 38 in position, the wing nut 52 is loosened sufficiently to enable the trim levers to be rotated by hand. The spacer members 62 act to decouple the trim levers so that rotation of one trim lever does not cause rotation of any of the other trim levers. The trim levers may be individually adjusted to intercept varying degrees of incident light falling on the mirror 24 as reflected from the surface of the paper 16. The levers can be manually adjusted without the operator's fingers getting into the light path during the adjustment period. The levers can be easily clamped in any position once they are set by tightening up on the wing nut 52.

In practice, the signal from the photo tube is reproduced on an oscilloscope using the same scanning rate as the scanning disk 30. The oscilloscope shows up the nonlinearities of the output during the scanning of a complete line. It is a simple process to adjust the trim levers of the light compensator until the image on the scope is a straight line.

What is claimed is:

1. In an optical system in which a reflected line image of a line source is formed, means for controlling the light intensity along the length of the line image comprising a plurality of trim levers, means rotatably supporting the trim levers along a common axis, said supporting means positioning the trim levers with said axis parallel to said line source but to one side of the optical path between the line image and line source, and with a portion of the trim levers projecting into the optical path between the line image and line source, means releasably clamping the trim levers, the clamping means holding each trim lever in any individually selected angular position and spacer means decoupling each trim lever from adjacent trim lines so that each trim lever is individually adjustable independently of all other trim levers.

2. Apparatus as defined in claim 1 wherein the spacer means includes a plurality of thin spacers positioned between the trim levers, and means securing the spacers against rotation about said axis, the portion of the trim levers projecting into said optical path projecting beyond the periphery of the spacers.

3. Apparatus as defined in claim 1 wherein each of the trim levers has a handle portion projecting beyond the periphery of the spacers for rotating the trim lever about said axis.

4. An adjustable light compensator for controlling the light distribution along a line image comprising mounting means having two spaced supporting members, first and second parallel shafts extending between and supported by said members, a plurality of trim levers each having a portion projecting into the light path forming the line image, each trim lever having a hole through which the first shaft extends, a plurality of spacers, each spacer having a pair of holes through which the first and second shafts extend, a spacer being positioned between each pair of trim levers, and releasable means for clamping the trim levers and spacers together to frictionally hold the trim levers in any selected angular position.

5. Apparatus as defined in claim 4 wherein the releasable means includes a rotatable member threaded on the one end of the first shaft to tighten against the supporting members and squeeze the trim levers and spacers between the supporting members.

6. Apparatus as defined in claim 4 wherein each of the trim levers has a handle portion projecting beyond the periphery of the spacers for rotating the trim levers.

References Cited

UNITED STATES PATENTS 3,397,025 8/1968 Alm .............. 350—271

RALPH D. BLAKESLEE, *Primary Examiner.*

R. K. ECKERT, Jr., *Assistant Examiner.*

U.S. Cl. X.R.

178—7.6